(12) United States Patent
Masuda (10) Patent No.: US 7,454,481 B2
(45) Date of Patent: Nov. 18, 2008

(54) APPARATUS, METHOD, PROGRAM, AND RECORDING MEDIUM FOR SETTING GUIDANCE INFORMATION

(75) Inventor: Kazumi Masuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 600 days.

(21) Appl. No.: 10/101,355

(22) Filed: Mar. 20, 2002

(65) Prior Publication Data

US 2003/0135597 A1 Jul. 17, 2003

(30) Foreign Application Priority Data

Dec. 19, 2001 (JP) ............................. 2001-386649

(51) Int. Cl.
- G06F 15/16 (2006.01)
- G01C 21/00 (2006.01)
- G01C 21/30 (2006.01)
- G01S 1/00 (2006.01)
- G06F 15/00 (2006.01)

(52) U.S. Cl. .................. 709/219; 709/217; 709/218; 709/229; 701/208; 701/209; 342/357.09; 345/501; 345/502; 345/504; 340/995.14; 340/995.15; 340/995.11; 340/995.1

(58) Field of Classification Search ............... 187/391, 187/393, 395, 396, 247, 414; 340/995.19, 340/995.1–995.11, 995.14, 995.15, 995.12, 340/995.23, 995.22, 995.26; 701/208, 209, 701/207, 210, 212; 342/357.09; 345/501, 345/98, 502

See application file for complete search history.

(56) References Cited

U.S. PATENT DOCUMENTS

| | | | |
|---|---|---|---|
| 6,351,819 B1 * | 2/2002 | Berglund et al. | 713/310 |
| 6,675,198 B1 * | 1/2004 | Hagiwara et al. | 709/208 |
| 2001/0029534 A1 * | 10/2001 | Spinks et al. | 709/224 |

FOREIGN PATENT DOCUMENTS

| | | | |
|---|---|---|---|
| JP | 404100439 A | * | 4/1992 |
| JP | 9-101928 | | 4/1997 |
| JP | 2001-325007 | | 11/2001 |

OTHER PUBLICATIONS

International Publication No. WO 02/39410.*
National Technical Report, vol. 38, No. 5, pp. 21-28 and 96-105, Oct. 29, 1992.
Japanese Patent Office Action, mailed Jun. 1, 2005 and issued in corresponding Japanese Patent Application No. 2001-386649.

* cited by examiner

Primary Examiner—Ashok B Patel
(74) Attorney, Agent, or Firm—Staas & Halsey LLP

(57) ABSTRACT

A guidance information setting apparatus for setting guidance information, comprising: a means for transmitting the unique information about a terminal to a server when the terminal is connected to a network; a means for receiving guidance information or the number (e.g., floor number) corresponding to the guidance information in response to transmitting said unique information to the server; a means for indicating the guidance information for a user based on said received guidance information or the guidance information extracted from a company-wide information based on the number corresponding to the guidance information.

The guidance information setting apparatus has a function of turning on or turning off the power to each of the terminals through the server.

12 Claims, 11 Drawing Sheets

| FLOOR NUMBER | MAC ADDRESS | REMARK |
|:---:|:---:|:---|
| 1 | ...... | A BUILDING 1F |
| 2 | ...... | A BUILDING 2F |
| 3 | ...... | A BUILDING 3F |
| 4 | ...... | B BUILDING 1F |
| 5 | ...... | A BUILDING 2F |

IF FLOOR NUMER=0, GUIDANCE INFORMATION ABOUT ALL FLOORS IS INDICATED

Fig.8

| LEVEL-1 DEPT. | LEVEL-2 DEPT. | LEVEL-n DEPT. | KANA NAME | KANJI NAME | FLOOR NO. | EXT-NO. | OTHERS |
|---|---|---|---|---|---|---|---|
| GENERAL AFFAIRS DEPT. | GENERAL AFFAIRS SECT. | ... | ニシオアヤコ | 西尾綾子 | 1 | 1-1234 | |
| GENERAL AFFAIRS DEPT. | GENERAL AFFAIRS SECT. | ... | ハヤカワヒロユキ | 早川浩之 | 1 | 1-1235 | |
| GENERAL AFFAIRS DEPT. | ACCOUNT'S SECT. | ... | ミノウラケンジ | 箕浦健二 | 1 | 1-1236 | |
| GENERAL AFFAIRS DEPT. | ACCOUNT'S SECT. | ... | イシダセイイチ | 石田誠一 | 1 | 1-1237 | |
| TECH-DEPT. | SECT.1 | ... | マスダカズミ | 増田和美 | 2 | 2-9876 | |
| TECH-DEPT. | SECT.2 | ... | アキバトモヒロ | 秋葉智弘 | 2 | 2-9875 | |
| DEVELOP MENT DEPT. | SECT.1 | ... | ミノベノボル | 美濃部昇 | 3 | 2-9874 | |
| DEVELOP MENT DEPT. | SECT.2 | ... | ナカオケイジ | 仲尾啓二 | 3 | 2-9873 | |

APPARATUS, METHOD, PROGRAM, AND RECORDING MEDIUM FOR SETTING GUIDANCE INFORMATION

BACKGROUND OF THE INVENTION

1. Field of the Invention

The present invention relates to an apparatus, method, program, and computer readable recording medium for setting guidance information.

2. Description of the Related Art

Conventionally, an automatic computer reception system is provided on every floor or in every building of a company. The terminal of the automatic computer reception system allows a user to input the name and/or department and/or the like of a member of the company who belongs to the department on the floor or in the building where the terminal is placed, indicates the candidates thereof, and offers a service such as calling the member automatically with the interphone when the user selects the name or the like of the member.

The conventional automatic computer reception system has a problem that it is necessary to replace the terminal with a new terminal when some failure has occurred to the automatic reception system, and a problem that it is necessary for the installer to make several settings so as to offer the service of retrieving the names and/or departments and/or the like only of the members belonging to the department on the floor or in the building where the terminal is placed.

SUMMARY OF THE INVENTION

It is therefore an object of the present invention to provide an apparatus, method, program, and computer readable recording medium for setting guidance information, wherein: each reception terminal is connected to a management server through a network in order to make it possible to turn on and off the power to the reception terminal automatically; the management server transmits the number (e.g. floor number) corresponding to the guidance information to the reception terminal when the reception terminal is connected to the network; and the reception terminal offers the guidance information, etc. extracted from the company-wide information based on the number.

The management server controls many reception terminals. Each of the reception terminals is connected to the management server through the network and is placed on a floor, etc. of the building of the company to give guidance information, about the members on the floor, etc., to a user.

Next, the operation of the guidance information setting apparatus will be described.

Each of the reception terminals transmits the unique information about the reception terminal to the management server when the reception terminal is connected to the network. The reception terminal indicates the guidance information for a user based on the guidance information received from the management server or the guidance information extracted from the company-wide information based on the number received from the management server.

When the reception terminal has no response from the server after being connected to the server, the reception terminal indicates the guidance information for a user based on the guidance information received from the management server last time or the guidance information extracted from the company-wide information based on the number received from the management server last time.

The reception terminal indicates the company-wide guidance information when the number received from the server is the particular number designating company-wide guidance.

The management server transmits a power turn-on command or a power turn-off command to each of the reception terminals registered in the terminal management master through the network, and receives the unique information about each of the reception terminals from each of the reception terminals through the network. When the received unique information about the reception terminal has been registered in the terminal management master, the management server transmits a number in the entry registered in the terminal management master to the reception terminal. On the other hand, when the received unique information about the reception terminal has not been registered in the terminal management master, the management server registers new unique information about the reception terminal and a particular number designating the company-wide guidance information in the terminal management master, and then transmits the particular number. Furthermore, the management server transmits the company-wide guidance information or the guidance information corresponding to the number in the entry or the particular number to the reception terminal.

Thus, each of the reception terminals is connected to the management server through a network so that the power to the reception terminal may be turned on and off automatically by the management server, and the guidance information or the number (e.g., floor number) corresponding to the guidance information is transmitted from the management server to the reception terminal when the reception terminal is connected to the network so that the guidance information transmitted from the management server or the guidance information extracted from the company-wide information based on the number transmitted from the management server may be given to the user.

DESCRIPTION OF THE PREFFERED EMBODIMENTS

The preferred embodiments of the present invention and the operations thereof are described below in detail with reference to the accompanying drawings.

Figure 1:
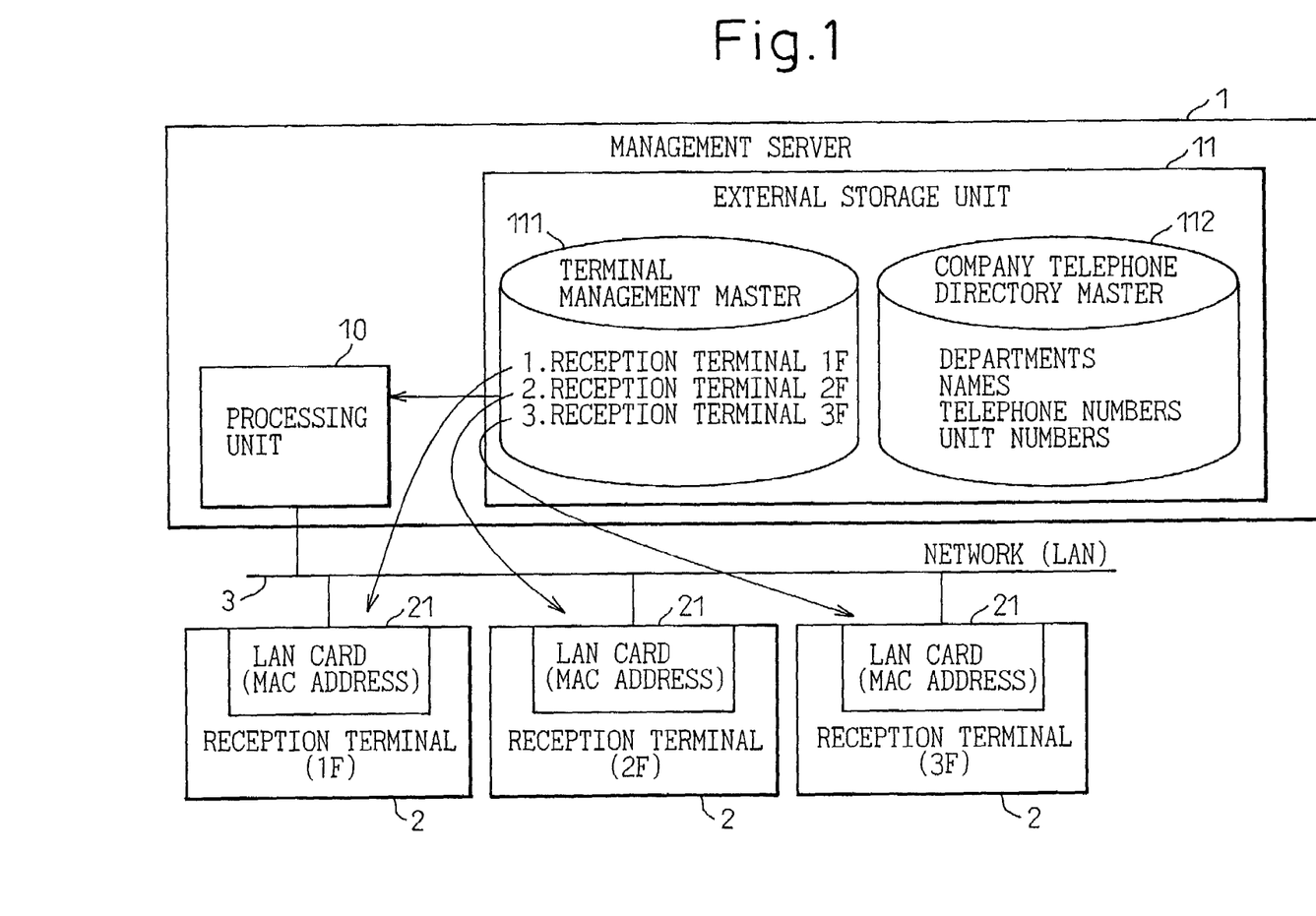
FIG. 1 is a block diagram depicting the system configuration of an embodiment of the present invention.

FIG. 1 is a block diagram depicting the system configuration of an embodiment of the present invention.

In FIG. 1, the management server 1 is a computer system for performing various processes according to programs. The management server 1 turns on or off the power to the many reception terminals 2 connected to the network 3, and downloads the guidance information, etc. to the reception terminals 2. The management server 1 comprises a processing unit 10 and an external storage unit 11. The external storage unit 11 contains files such as a terminal management master 111 and a company telephone directory master 112.

Figure 7:
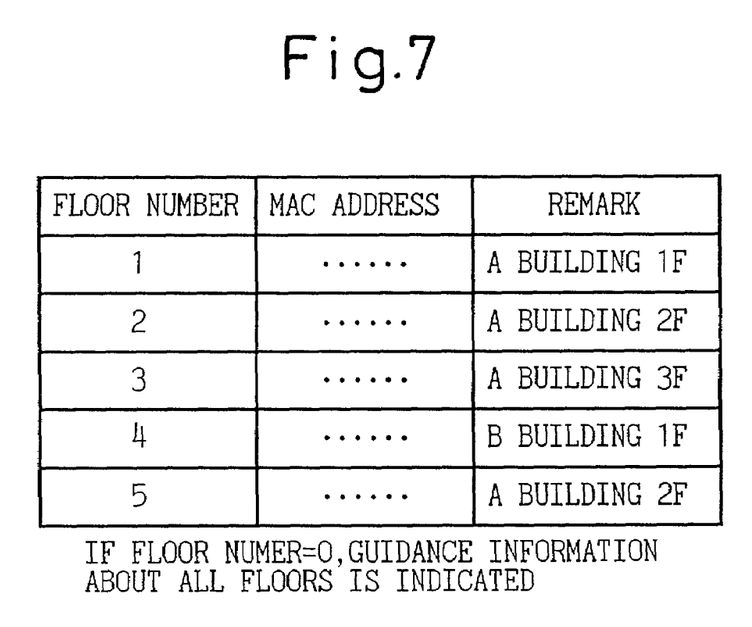
FIG. 7 shows an example of a terminal management master.

The terminal management master 111 is a file in which the numbers (e.g., floor numbers) of the reception terminals 2, and the MAC (Medium Access Control) addresses and the floor information of the reception terminals 2 related to the numbers of the reception terminals 2 are registered, as shown in FIG. 7, and by which it is determined that any of the reception terminals offers the guidance information of any of the floors (installation places).

Figure 8:
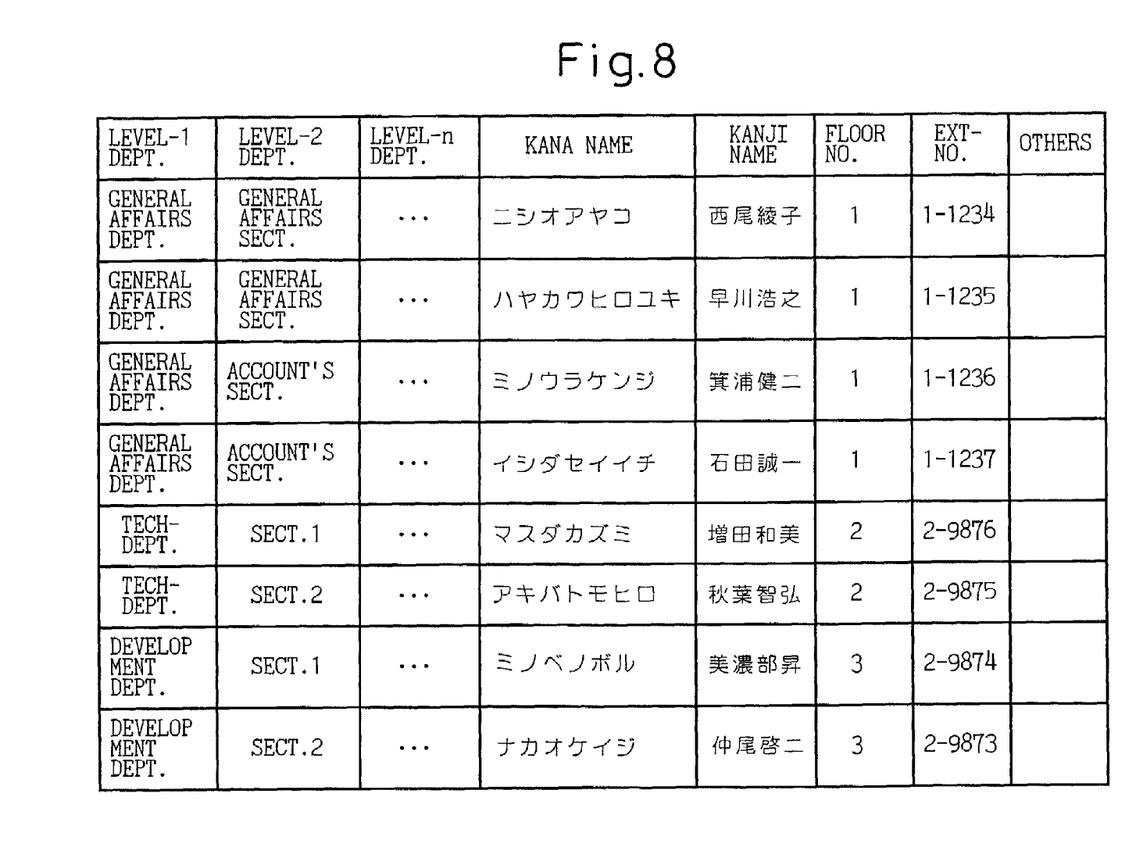
FIG. 8 shows an example of a company-wide telephone directory master.

The company telephone directory master 112 is a file, as shown in FIG. 8, for the registration and management of the names, departments, telephone numbers (numbers for contact), etc. of all members of the company.

The reception terminal 2 is connected to the management server 1 through the network 3, and is placed on each floor of the building. When a user (a customer from the outside) inputs and selects the name and/or department and/or the like of the member whom the user is going to make contact with, the reception terminal 2 performs a so-called reception guidance such as indication of, and/or calling, the extension number of the member.

The operation of the overall system shown in FIG. 1 is described below with reference to FIG. 2.

Figure 2:
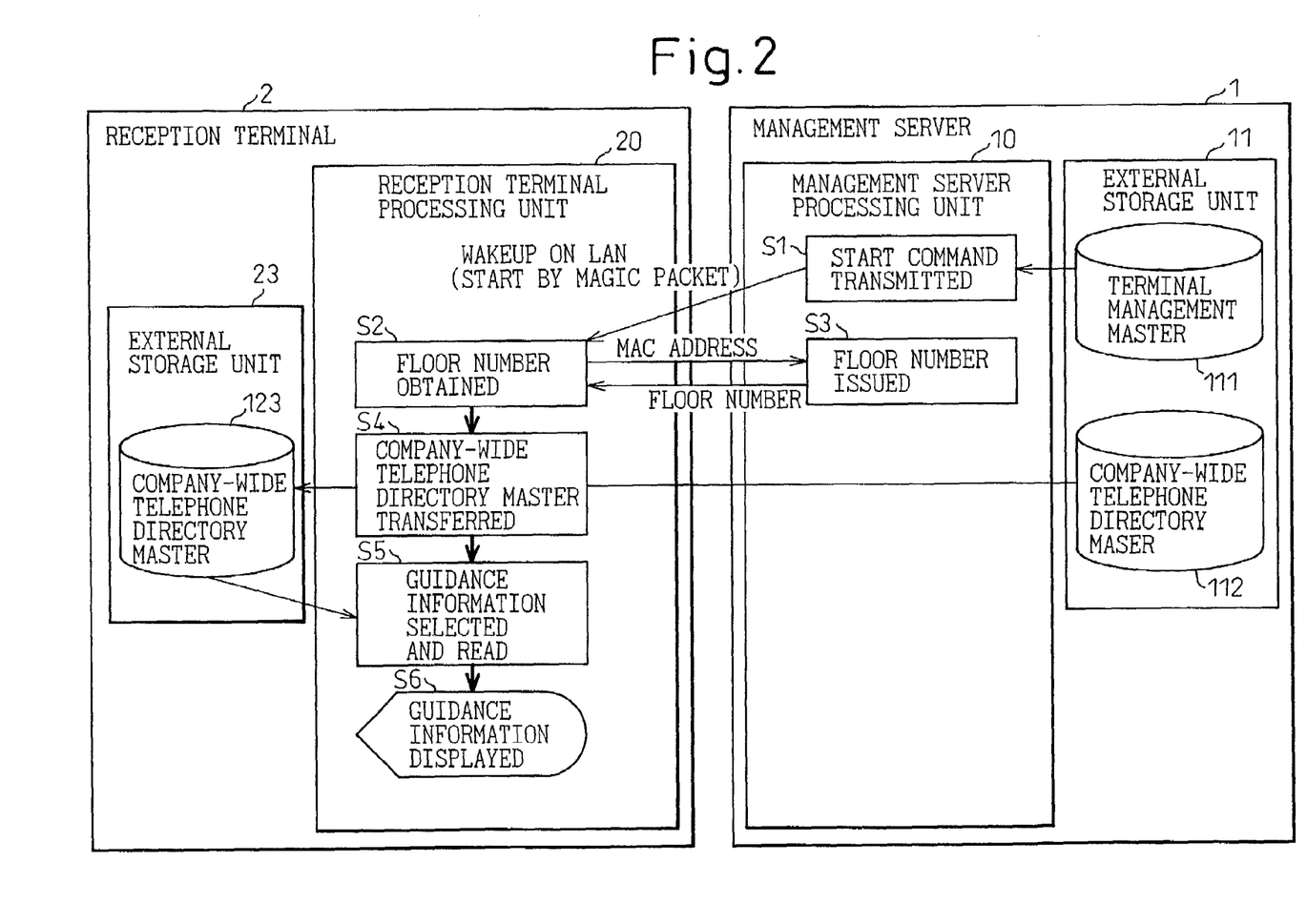
FIG. 2 is a flow chart depicting the operation of an embodiment of the present invention.

FIG. 2 is a flow chart depicting the operation of this embodiment of the present invention. In FIG. 2, the steps S1 and S3 are the processes by the management server 1 and are executed by the processing unit 10, and the steps S2, and S4 to S6 are the processes by each of the reception terminals 2 and are executed by the processing units 20 of the reception terminals 2.

At the step S1, the server 1 transmits a start command to each of the reception terminal 2. That is, the server 1 transmit, through the network 3, a packet/command (e.g., Magic-Packet) of instructing the reception terminal to turn on the power thereto to the reception terminals 2 registered in the terminal management master 111. Wakeup On Lan supported by the packets of TCP/IP, IPX, etc., transmits information (synchronizing stream (6 bites FFh) and 16 times of IEEE address (MAC address) are repeated) constituting the MagicPack to the reception terminal 2 through the network 3, and turns on (or off) the power to the CPU board (not shown) of the reception terminal 2 when the LAN controller 21, which is also called a LAN card (see FIG. 1), receives the information constituting the MagicPack.

At the step S2, the reception terminal 2 obtains a floor number. That is, the reception terminal 2 which was started at the step S1 transmits the MAC address stored in the memory on the LAN card 21 to the server 1, and then the server 1, at the step S3, transmits the floor number, which is related to the MAC address and registered in the terminal management master 111, to the reception terminal 2, and at the step S2 the reception terminal 2 obtains the transmitted floor number.

At the step S4, the company-wide telephone directory master is transmitted to the reception terminal 2. That is, the server 1 transmits the company-wide telephone directory master to the reception terminal 2 through the network 3. The reception terminal 2 stores the received company-wide telephone directory master in the external storage unit 23. The company-wide telephone directory master stored in the external storage unit 23 is shown as the company-wide telephone directory master 123.

At the step S5, the reception terminal 2 selects and reads the guidance information. That is, based on the floor number obtained at the step S2, the reception terminal 2 extracts the guidance information, to which the floor number has been set, from the company-wide telephone directory master 123 which was transferred to the external storage unit 123 at the step S4, and reads and keeps the guidance information.

At the step S6, the guidance information is displayed on the CRT (not shown) of the reception terminal 2. That is, according to the requirement (e.g., guidance requirement designating the name, department, etc. of the member A) by a user, the reception terminal displays the guidance information (e.g., the extension number of the member A), and/or dials the extension number to call the member A.

As described above, the server 1 requests the reception terminals 2 placed on the many floors to turn on the power thereto, automatically, and at the same time, through the network 3, at the time (predetermined time) for starting work in the early morning, and then requests each of the reception terminals, the power to which has been turned on, to transmit the MAC address to the server 1, and then transmits the floor number corresponding the MAC address and the company-wide telephone directory master 112 to the reception terminal 2. Each of the reception terminals 2 extracts the telephone directory of the floor where the reception terminal is placed from the company-wide telephone directory master 112 based on the received floor number, and displays the extension telephone number and/or the desk position and/or the like corresponding to the name and/or department and/or the like input by the user, for example, on the display. Thus, various kinds of guidance information may be given to the user, and the company-wide telephone directory master 112 is always renewed to the latest one so that the latest guidance information may be supplied to each of the reception terminals automatically. The above operation will be detailed below.

Figure 3A:
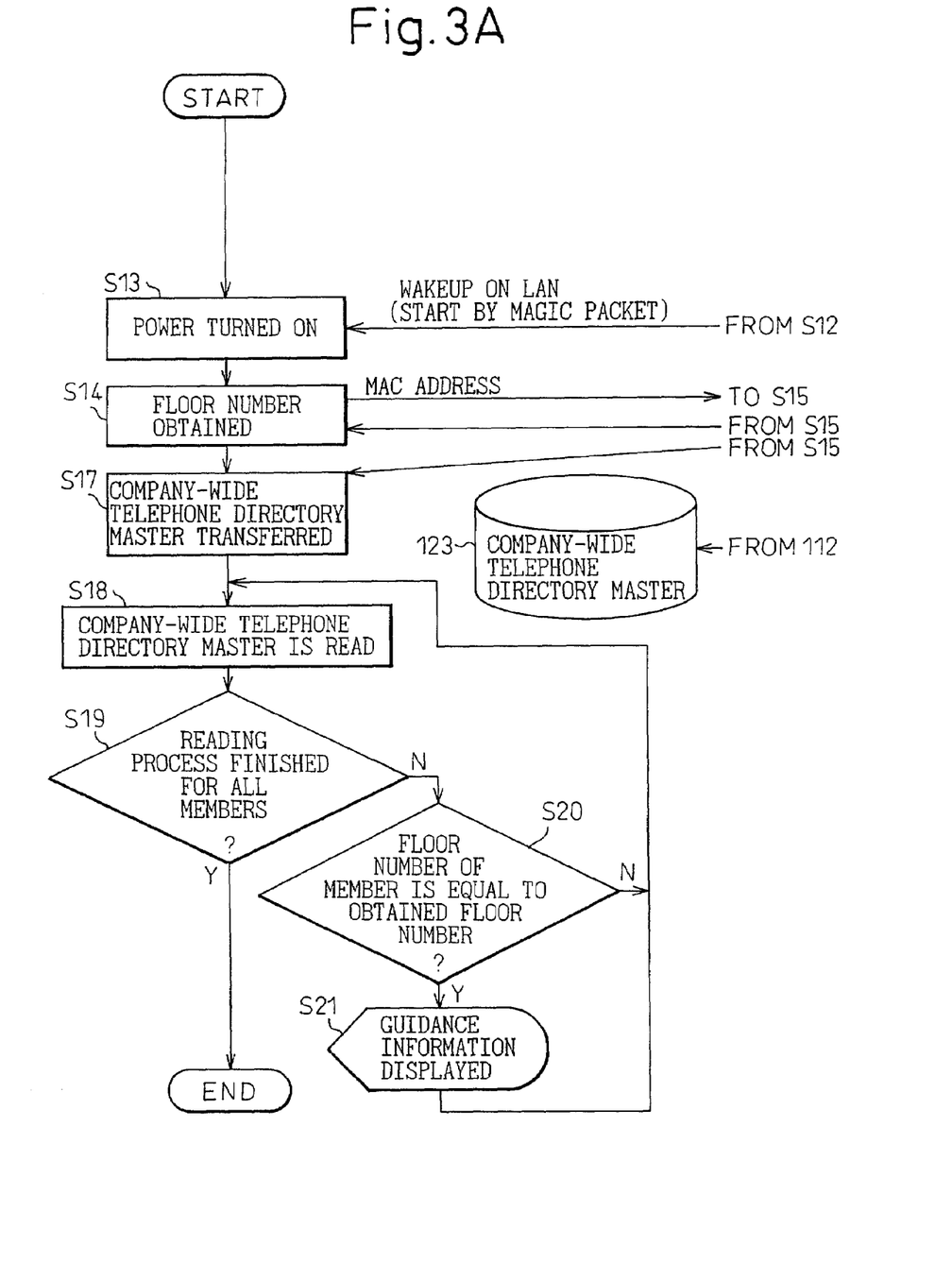
FIG. 3A and FIG. 3B comprise a flow chart depicting a first specific example of the operation of an embodiment of the present invention.
Figure 3B:
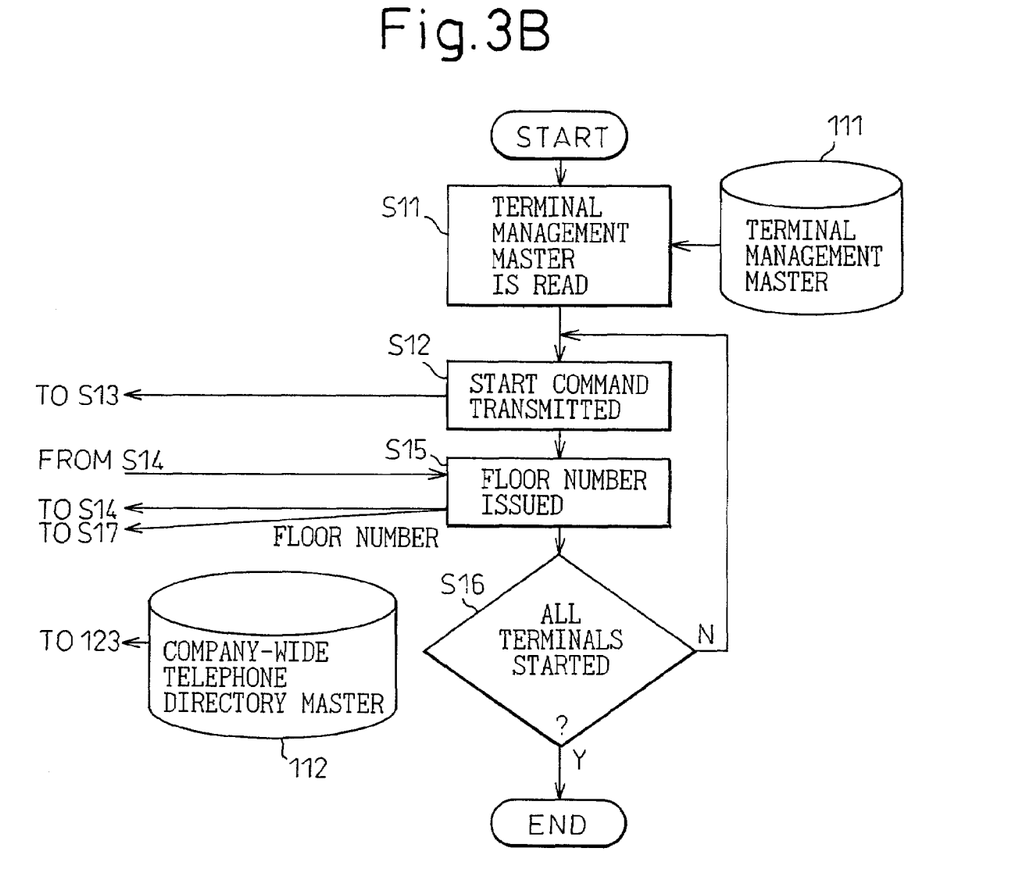

FIG. 3A and FIG. 3B comprise a flow chart depicting a first specific example of the operation of this embodiment of the present invention.

At the step S11 in FIG. 3B, the server 1 reads the terminal management master 111.

At the step S12, the server 1 transmits the start command to the reception terminals 2.

At the step S13, the LAN controller 21 of the reception terminal 2 which has received the start command at the step S12 starts this reception terminal 2 (turns on the power to the CPU board of the reception terminal 2 to start the reception terminal 2).

At the step S14, the reception terminal 2 obtains a floor number. That is, the reception terminal 2 transmits a packet, in which the MAC address of the reception terminal 2 is set, of requesting a floor number to the server 1, and the server 1, at the step S15, issues a floor number (the server 1 retrieves, from the terminal management master 111 discussed later, the floor number corresponding to the MAC address required by the reception terminal 2 at the step S14), and then transmits the floor number to the reception terminal 2.

At the step S16, the server 1 determines whether all of the reception terminals have started. In case of yes, the process of the server 1 is finished. In case of no, the process returns to the step S12.

At the step S17, the company-wide telephone directory master 112 is transmitted. That is, the reception terminal 2 requests the server 1 to transmit the company-wide telephone directory master 112 to the reception terminal 2 through the network 3. The company-wide telephone directory master in the reception terminal 2 is shown as the company-wide telephone directory master 123 in FIG. 3A.

At the step S18, the company-wide telephone directory master 123 is read.

At the step S19, it is determined whether the reading process has finished for all of the members of the company registered in the company-wide telephone directory master 123. In case of yes, the process is finished. In case of no, the process goes to the step S20.

At the step S20, it is determined whether the floor number of the member designated by a user is equal to the floor number obtained at the step S14. In case of yes, the guidance information is displayed at the step S21, and then the process returns to the step S18. In case of no, the process returns to the step S18. Thus, the reception terminal 2 may automatically perform a so-called reception operation of extracting only the guidance information, corresponding to the floor number obtained at the step S14, of the service area of this reception terminal 2 from the company-wide telephone directory master 123, and of displaying the extension telephone number and/or the desk position and/or the like corresponding to the name and/or department and/or the like input and/or selected by a user, and/or of dialing the extension telephone number.

As described above, the server 1 automatically transmits a power start command to the reception terminals 2, whose MAC addresses are registered in the terminal management master 111, in order to start the reception terminals at the time for starting work in the early morning, and then requests the reception terminals 2 which have started to transmit the floor number request in which a MAC address has been set, and then transmits the floor number designating the service area corresponding to the MAC address. Thus, the reception terminal 2 may extract the guidance information of the service area from the company-wide telephone directory master 123 based on the floor number, and gives the guidance information to the user (for example, displays the extension telephone number and/or the desk position corresponding to the name and/or department which have been input).

Figure 4:
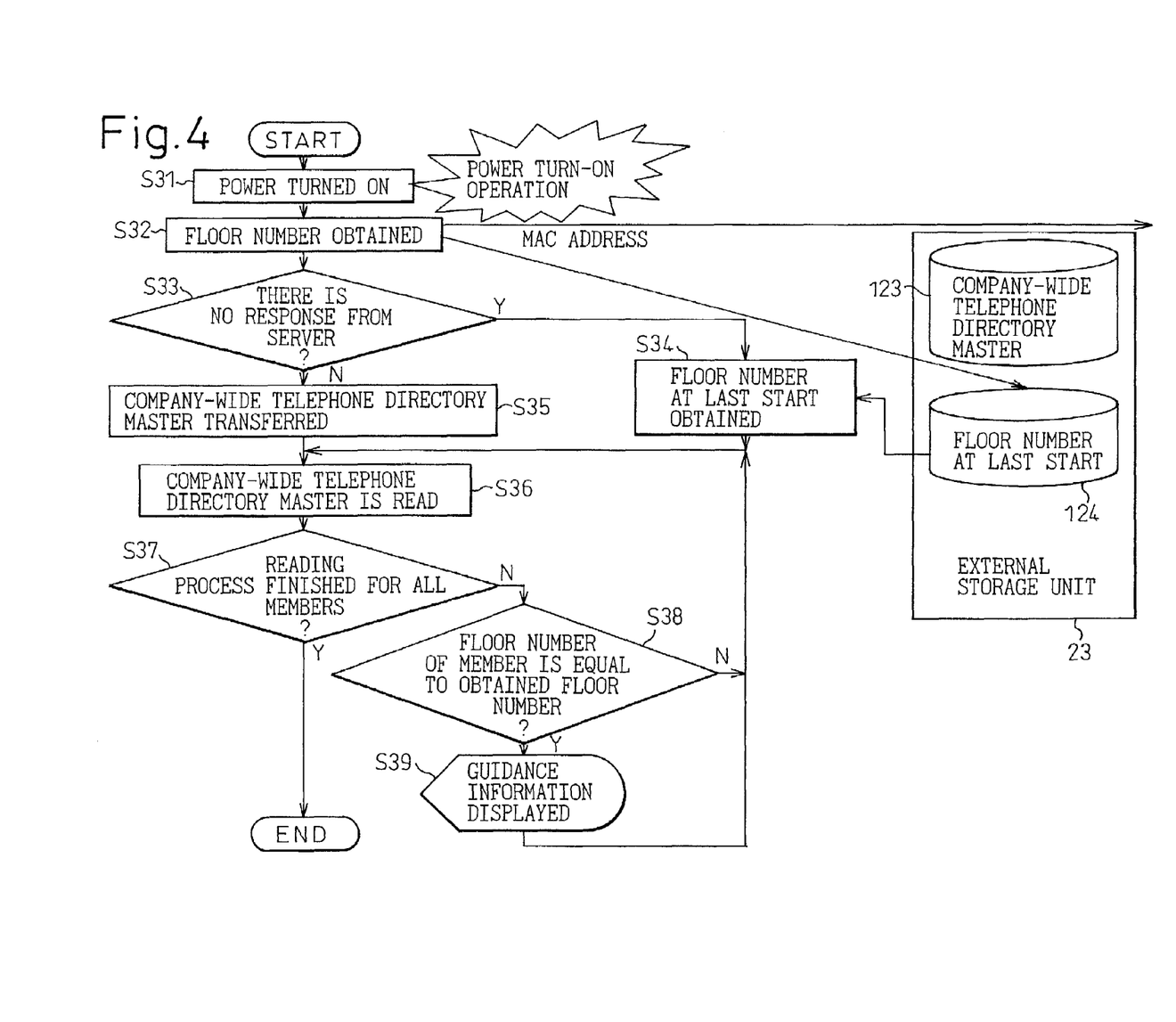
FIG. 4 is a flow chart depicting a second specific example of the operation of an embodiment of the present invention.

FIG. 4 is a flow chart depicting a second specific example of the operation of this embodiment of the present invention.

At the step S31 in FIG. 4, the power to the reception terminal 2 is turned on. That is, an administrator or the like turns on the power to the reception terminal 2.

At the step S32, the reception terminal 2 obtains a floor number. That is, the reception terminal the power to which was turned on at the step S31 starts automatically, and transmits the packet in which a MAC address is set to the server 1 through the network 3 to request a floor number.

At the step S33, it is determined whether there is no response from the server 1. That is, after the packet in which a MAC address is set was transmitted to the server 1 at the step S32, it is determined whether there is no response from the server 1. In case of yes, the reception terminal 2 assumes that some failure of the server 1 has occurred, and obtains, at the step S34, the floor number stored in the external storage unit 23 or a volatile memory (not shown) at the last start, and then the process goes to the step S36. In case of no at the step S33, since the reception terminal 2 has obtained a floor number from the server 1, the process goes to the step S35. At the step S35, the server 1 transmits the latest company-wide telephone directory master 112 to the reception terminal 2. The company-wide telephone directory master in the external storage unit 23 is replaced with the latest company-wide telephone directory master. The process then goes to the step S36.

At the step S36, the company-wide telephone directory master 123 is read. That is, the contents of the company-wide telephone directory master 123 stored in the external storage unit 23 are read in sequence.

At the step S37, it is determined whether the reading process has finished for all of the members of the company registered in the company-wide telephone directory master 123. In case of yes, the process is finished. In case of no, the process goes to the step S38.

At the step S38, it is determined if the floor number of the member designated by a user is equal to the floor number obtained at the step S32 or S34. That is, it is determined whether the floor number obtained from the server 1 is equal to the floor number in the entry read out from the company-wide telephone directory master 123, or it is determined, in case that a floor number could not be obtained, whether the floor number obtained at the last time is equal to the floor number in the entry read out from the company-wide telephone directory master 123. In case of yes, the guidance information is displayed (the extension telephone number and/or the desk position and/or the like of the member corresponding to the retrieval request designating the name and/or department and/or the like of the member from a user (customer) are displayed on the guidance screen) at the step S39, and then the process returns to the step S36. In case of no, the process returns to the step S36.

As described above, when the power to the reception terminal 2 is turned on, the reception terminal 2 transmits the MAC address to the server1. When there is no response from the server 1, the reception terminal 2 reads the floor number obtained at the last start. On the other hand, when the reception terminal 2 receives a floor number from the server 1, the reception terminal 2 keeps the floor number, and then requests the server 1 to transmit the latest company-wide telephone directory master and replaces the company-wide telephone directory master stored in the external storage unit 23 with the latest company-wide telephone directory master. Thus, the reception terminal may give a reception guidance to a user by extracting the guidance information corresponding the floor number from the company-wide telephone directory master based on the floor number and by displaying the extension telephone number and/or the desk position when the user has requested the guidance about a member whose name and/or department and/or the like have been input on the guidance information displayed. Thus, even if the reception terminal 2 can not be connected to the server 1, when the power to the reception terminal is turned on, the reception terminal 2 may extract the guidance information corresponding to the floor where the reception terminal 2 is placed from the company-wide telephone directory master 123 which has been kept based on the floor number obtained at the last start, and may display the extension telephone number and/or the desk position of a member corresponding to the request of the guidance about the member by a user, and thereby may start the reception guidance without a stop.

Figure 5A:
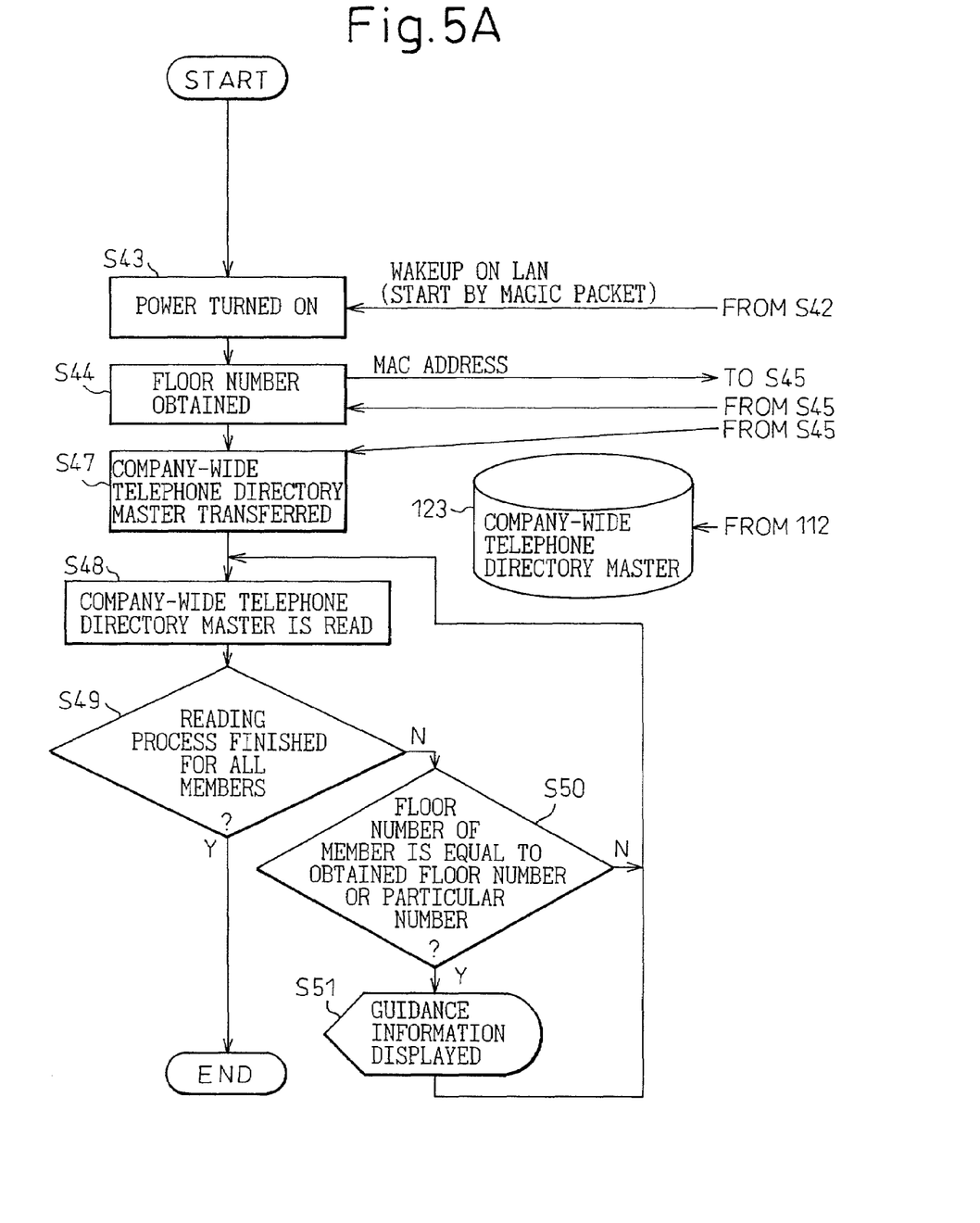
FIG. 5A and FIG. 5B comprise a flow chart depicting a third specific example of the operation of an embodiment of the present invention.
Figure 5B:
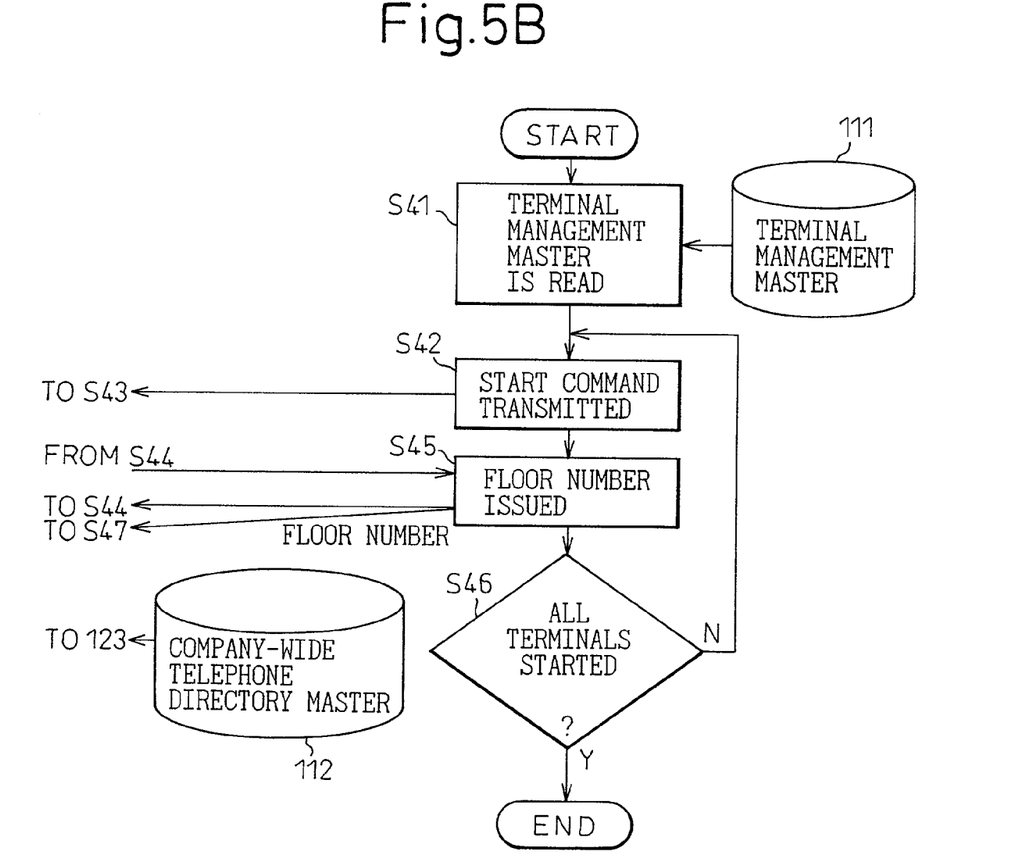

FIG. 5A and FIG. 5B comprise a flow chart depicting a third specific example of the operation of an embodiment of the present invention.

At the step S41 in FIG. 5B, the server 1 reads the terminal management master 111.

At the step S42, the server 1 transmits the start command to the reception terminals 2.

At the step S43, the LAN controller 21 of the reception terminal 2 which has received the start command at the step S42 starts this reception terminal 2 (turns on the power to the CPU board of the reception terminal 2 to start the reception terminal 2).

At the step S44, the reception terminal 2 obtains a floor number. That is, the reception terminal 2 transmits a packet, in which the MAC address of the reception terminal 2 is set, of requesting a floor number to the server 1, and the server 1, at the step S45, issues a floor number (the server 1 retrieves, from the terminal management master 111 discussed later, the floor number corresponding to the MAC address required by the reception terminal 2 at the step S44), and then transmits the floor number to the reception terminal 2.

At the step S46, the server 1 determines whether all of the reception terminals have started. In case of yes, the process of the server 1 is finished. In case of no, the process returns to the step S42.

At the step S47, the company-wide telephone directory master 112 is transmitted. That is, the reception terminal 2 requests the server 1 to transmit the company-wide telephone directory master 112 to the reception terminal 2 through the network 3. The company-wide telephone directory master in the reception terminal 2 is shown as the company-wide telephone directory master 123 in FIG. 5A.

At the step S48, the company-wide telephone directory master 123 is read.

At the step S49, it is determined whether the reading process has finished for all of the members of the company registered in the company-wide telephone directory master 123. In case of yes, the process is finished. In case pf no, the process goes to the step S50.

At the step S50, it is determined whether the floor number of the member designated by a user is equal to the floor number obtained at the step S44. That is, it is determined whether the floor number obtained at the step S44 is equal to the floor number in the entry read out from the company-wide telephone directory master 123, or equal to the particular number (e.g., 0) designating the company-wide guidance information. In case of yes, the reception terminal 2 may automatically perform so-called reception operation, in relation to the contents of the entry extracted from the company-wide telephone directory master 123, of displaying the extension telephone number and/or the desk position and/or the like corresponding to the name and/or department and/or the like input and/or selected by a user, and/or of dialing the extension telephone number.

Figure 6A:
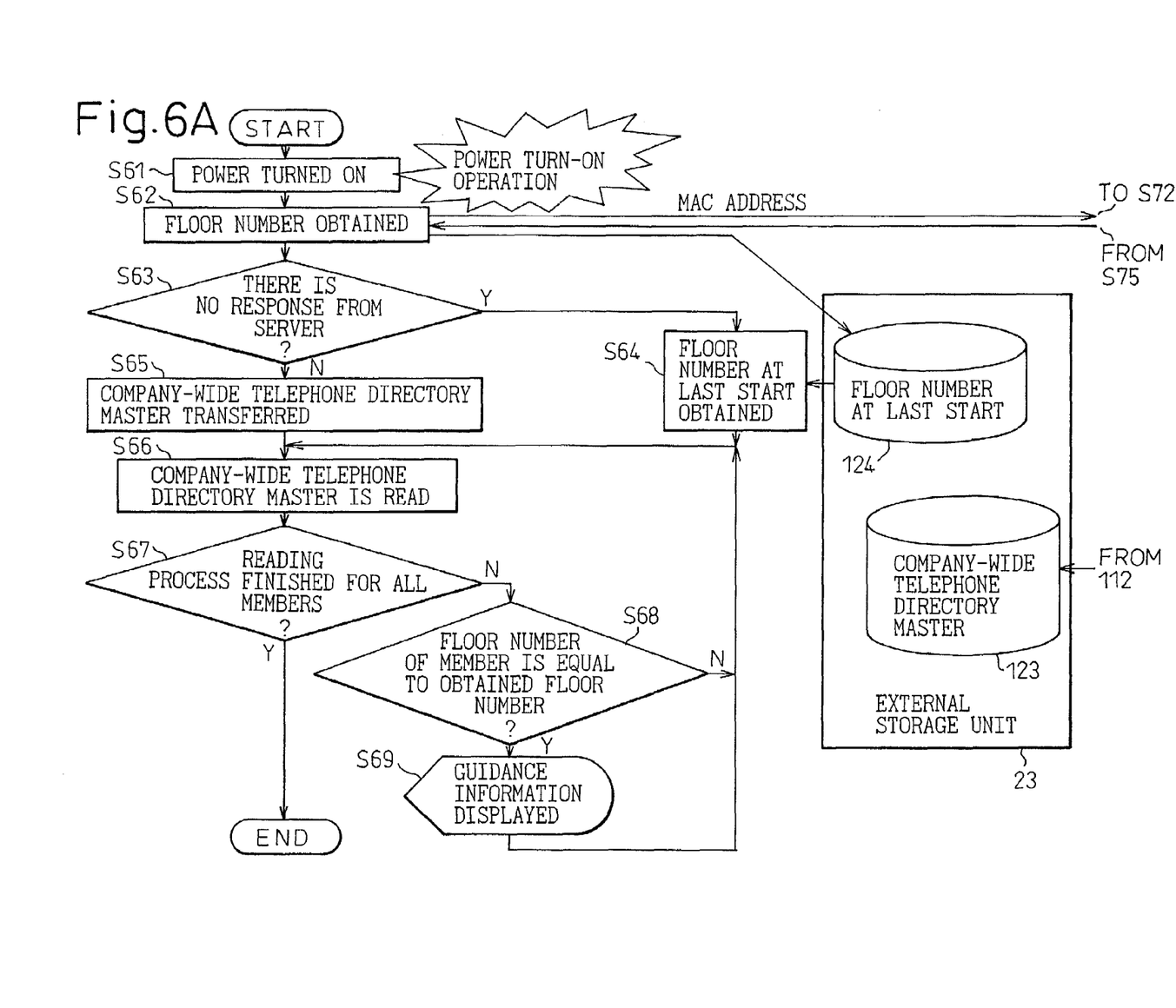
FIG. 6A and FIG. 6B comprise a flow chart depicting a fourth specific example of the operation of an embodiment of the present invention.
Figure 6B:
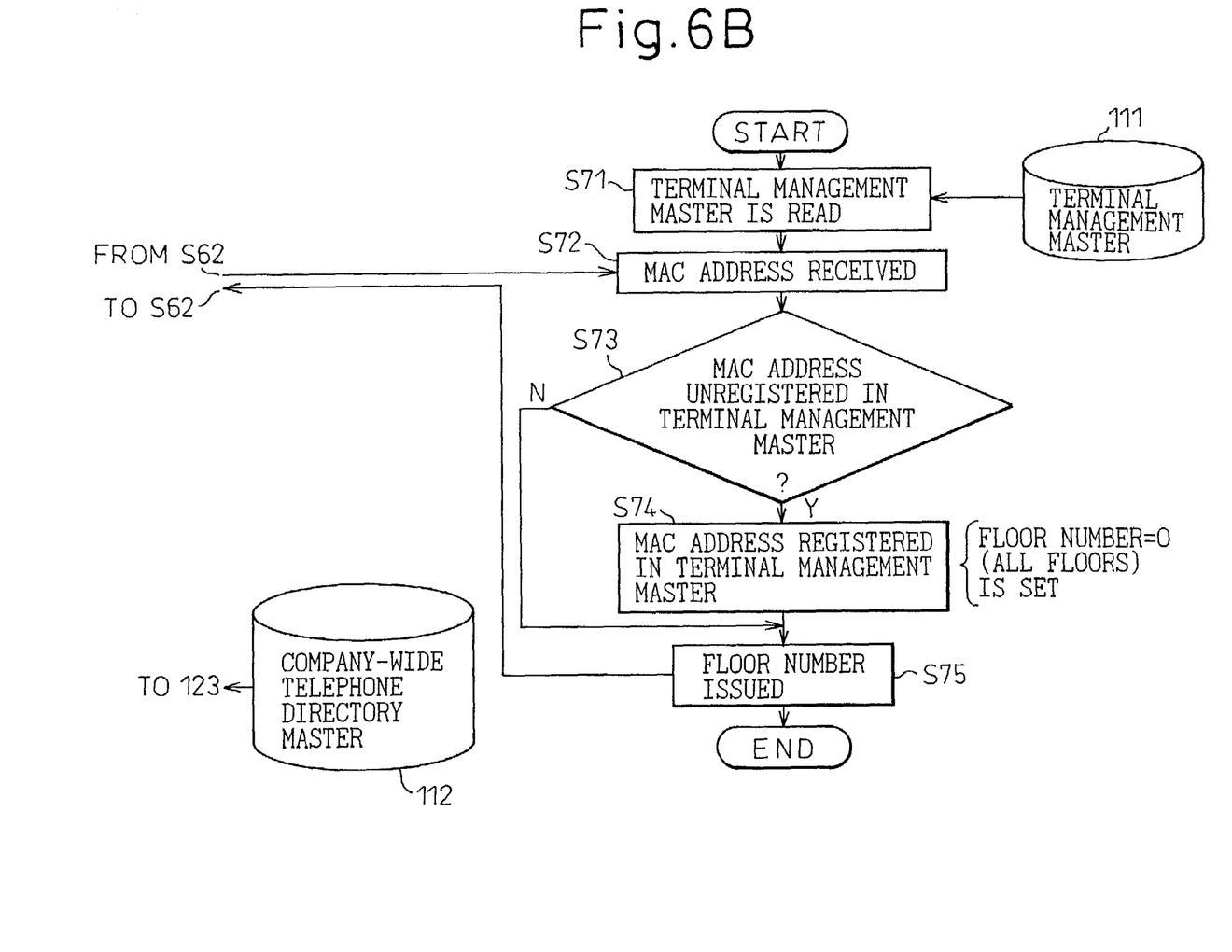

FIG. 6A and FIG. 6B comprise a flow chart depicting a fourth specific example of the operation of this embodiment of the present invention. This operation includes the automatic setting of a MAC address.

At the step S61 in FIG. 6A, the power to the reception terminal 2 is turned on. That is, an administrator or the like performs the operation of turning on the power to the reception terminal 2.

At the step S62, the reception terminal 2 obtains a floor number. That is, the reception terminal, the power to which was turned on at the step S61, starts automatically, and transmits the packet in which a MAC address is set to the server 1 through the network 3 to request a floor number. Corresponding to this operation, the server 1 which has read the terminal management master 111 at the step S71 receives the MAC address from the reception terminal 2 at the step S72. The server 1, at the step S73, determines whether the MAC address has been unregistered in the terminal management master 111. In case of yes, the server 1 registers the MAC address in the terminal management master 111 at the step S74, and then issues the floor number (0 (zero) designating the all floors in this example)) to transmit it to the reception terminal 2. On the other hand, in case of no at the step S73, the server 1 reads out the floor number in the entry of the MAC address registered in the terminal management master 111, and then transmits the floor number which has read out at the step S75 to the reception terminal 2.

At the step S63, it is determined whether there is no response from the server 1. That is, the reception terminal 2 transmits the packet requesting a floor number to the server 1 at the step S62, and determines whether there is no response from the server 1 after a predetermined time has passed. In case of yes, the reception terminal 2 assumes that some failure at the server 1 has occurred, and obtains, at the step S64, the floor number stored in the external storage unit 23 at the last start, and then the process goes to the step S66. In case of no at the step S63, since the reception terminal 2 has obtained a floor number from the server 1, the process goes to the step S65. At the step S65, the server 1 transmits the latest company-wide telephone directory master 112 to the reception terminal 2. The company-wide telephone directory master in the external storage unit 23 is replaced with the latest company-wide telephone directory master. The process then goes to the step S66.

At the step S66, the company-wide telephone directory master 123 is read. That is, the contents of the company-wide telephone directory master 123 stored in the external storage unit 23 are read in sequence.

At the step S67, it is determined whether the reading process has finished for all of the members of the company registered in the company-wide telephone directory master 123. In case of yes, the process is finished. In case of no, the process goes to the step S68.

At the step S68, it is determined whether the floor number of the member designated by a user is equal to the floor number obtained at the step S62 or S64. That is, it is determined whether the floor number obtained from the server 1 is equal to the floor number in the entry read out from the company-wide telephone directory master 123, or it is determined, in case that a floor number could not be obtained, whether the floor number obtained at the last time is equal to the floor number in the entry read out from the company-wide telephone directory master 123. In case of yes, the guidance information is displayed (the extension telephone number and/or the desk position and/or the like of the member corresponding to the retrieval request designating the name and/or department and/or the like of the member from a user (customer) are displayed on the guidance screen) at the step S69, and then the process returns to the step S66. In case of no, the process returns to the step S66.

As described above, when the power to the reception terminal 2 is turned on, the reception terminal 2 transmits the MAC address to the server1. When there is no response from the server 1, the reception terminal 2 reads the floor number obtained at the last start. On the other hand, when the reception terminal 2 receives a floor number from the server 1, the reception terminal 2 obtains this floor number, and then requests the server 1 to transmit the latest company-wide telephone directory master and replaces the company-wide telephone directory master stored in the external storage unit 23 with the latest company-wide telephone directory master. When the MAC address which has been transmitted to the server 1 is not registered in the terminal management master 111, that is, when a new reception terminal 2 is connected to the network 3 and transmits a MAC address to the server 1 to request a floor number, the server 1 registers the MAC address of the new reception terminal 2 in the terminal management master 111. The server 1 sets the floor number 0 (zero) designating the guidance about all of the floors, and transmits the floor number 0 to the new reception terminal 2. The reception terminal may give a reception guidance to a user by extracting the guidance information corresponding the floor number from the company-wide telephone directory master based on the floor number and by displaying the extension telephone number and/or the desk position when the user has requested the guidance about a member whose name and/or department and/or the like have been input on the guidance information displayed.

When a reception terminal 2 is out of order, the reception terminal 2 is removed from the network, and a new reception terminal 2 is connected to the network instead of it. After the power to the new reception terminal 2 has been turned on, the new reception terminal 2 is connected to the server 1, and the MAC address of the new reception terminal 2 is registered in the terminal management master 111. The server 1 then sets the floor number 0, and transmits the floor number 0 to the new reception terminal. Consequently, the new reception terminal 2 is incorporated in the terminal management master 111. After that, the administrator may change, whenever necessary, the floor number 0 in the terminal management master 111 to the floor number corresponding to the MAC address of the new reception terminal 2 so that the new reception terminal 2 may offer the reception guidance only of the floor where the new reception terminal 2 is placed.

FIG. 7 shows an example of the terminal management master 111 in this embodiment. Registered in the terminal management master 111 are floor numbers, MAC addresses, remarks (place and floor name corresponding to the floor number), and others related to the floor numbers.

The floor numbers are the numbers designating the places such as the floors of a building of a certain company. The MAC addresses are the MAC addresses of the reception terminals 2 placed on the floors or the like designated by the floor numbers. "A building 1F" and the like in the remark column mean the places designated by the floor numbers. The MAC address is a unique address given to the hardware of the reception terminal 2 connected to the network.

As described above, since the floor numbers are set being related to the MAC addresses (unique addresses of the reception terminals), the place covered by each of the reception terminals 2 (the place designated by the floor number) may be registered and managed, and the guidance information which is offered in the place designated by the floor number may be extracted from the company-wide telephone directory master 112 described below based on the floor number.

FIG. 8 shows an example of the company-wide telephone directory master in this embodiment. In the company-wide telephone directory master 112, the following data are registered as shown in FIG. 8.

Level-1 Department
Level-2 Department
. . .
Level-n Department
Kana Name
Kanji Name
Floor Number
(Number designating a place in the company)
Extension Telephone Number
Others (Desk position on the floor, etc.)

In FIG. 8, level-1, level-2, . . . , level-n departments are the higher level to lower level departments to which a member of the company belongs (for example, the general affairs department—the general affairs section— . . . ). Kana name is the name expressed with Japanese Kana characters, Kanji name is the name expressed with Chinese characters. The floor number is the number of the floor where the department to which a member of the company belongs is located.

As described above, since departments, names, floor numbers, extension numbers, and others (desk positions, places shown in the layout of the department) are registered, the reception terminal may retrieve the extension telephone numbers and/or desk positions corresponding the floor number, and display them on the guidance screen of the reception terminal to offer the guidance information. That is, the reception terminals 2 to which floor numbers 1 to n are transmitted respectively, may retrieve the extension telephone numbers and/or the desk positions of the members to whom the floor numbers are set respectively, and display them to offer the guidance information. On the other hand, the reception terminal to which the floor number 0 is transmitted may retrieve extension telephone numbers and/or the desk positions of the members to whom all of the floor numbers are set, and display them to offer the guidance information.

As described above, in the present invention, each of the reception terminals 2 is connected to the management server 1 through a network 3 so that the power to the reception terminal 2 may be turned on and off automatically by the management server 1, and the number (e.g., floor number) corresponding to the guidance information is transmitted from the management server 1 to the reception terminal 2 when the reception terminal 2 is connected to the network 3 so that the extension telephone number and/or desk position and/or the like, of the member designated by a user, in the guidance information extracted from the company-wide information based on the number, or in the company-wide guidance information, may be indicated for the user.

When a reception terminal 2 is out of order, the reception terminal 2 is removed from the network, and a new reception terminal 2 is connected to the network instead of it. After the power to the new reception terminal 2 has been turned on, the new reception terminal 2 is connected to the server 1, and the MAC address of the new reception terminal 2 is transmitted to the server 1 automatically and registered in the terminal management master 111. The reception terminal 2 receives a floor number and the company-wide telephone directory master 112 so that the extension number and/or desk position retrieved based on the name and/or department designated by a user may be indicated for the user. And the administrator may change, whenever necessary, the floor number, in the terminal management master 111, corresponding to the MAC address of the new reception terminal 2, to any number so that the new reception terminal 2 may offer the guidance information only about the members on the floor where the new reception terminal 2 is placed.

What is claimed is:

1. A guidance information setting apparatus, comprising:
   means for transmitting unique information about a reception terminal from the reception terminal to a server when the reception terminal is connected to a network to which the server is connected;
   means for receiving at the reception terminal an identification number, corresponding to guidance information, in response to transmitting said unique information to the server;
   means for indicating the guidance information at the reception terminal to a user based on the guidance information extracted from company-wide information based on the received identification number; and
   means for indicating the guidance information to a user, when said reception terminal has received no response from said server, based on guidance information extracted from company-wide information stored in said reception terminal based on a last received identification number.

2. The guidance information setting apparatus of claim 1, wherein when said received identification number is a particular identification number designating company-wide guidance, company-wide guidance information is indicated to the user.

3. A guidance information setting apparatus, comprising:
means for transmitting a power turn-on command or a power turn-off command to each reception terminal registered in a master through a network;
means for receiving unique information about each of the reception terminals transmitted therefrom through the network;
means for transmitting an identification number in an entry registered in the master to a specific reception terminal when the received unique information about the specific reception terminal has been registered in the master, registering new unique information and a particular identification number designating company-wide guidance in the master, and transmitting the particular identification number to the specific reception terminal, when the received unique information has not been registered in the master; and
means for transmitting company-wide guidance information, or the guidance information corresponding to the identification number in the entry, or the particular identification number extracted from company-wide information to the reception terminals.

4. A guidance information setting method, comprising:
transmitting the unique information about a reception terminal from the reception terminal to a server when the reception terminal is connected to a network to which the server is connected;
receiving at the reception terminal an identification number corresponding to guidance information in response to transmitting said unique information to the server;
indicating the guidance information at the reception terminal for a user based on the guidance information extracted from company-wide information based on the received identification number; and
indicating the guidance information to a user, when said reception terminal has received no response from said server, based on the guidance information extracted from a company-wide information stored in said reception terminal based on a last received identification number.

5. The guidance information setting method of claim 4, wherein when said received identification number is a particular identification number designating company-wide guidance, company-wide guidance information is indicated to the user.

6. A guidance information setting method, comprising:
transmitting a power turn-on command or a power turn-off command to each reception terminal registered in a master through a network;
receiving unique information about each of the reception terminals transmitted therefrom through the network;
transmitting an identification number in an entry registered in the master to a specific reception terminal when the received unique information about the specific reception terminal has been registered in the master, registering new unique information and a particular identification number designating company-wide guidance in the master, and transmitting the particular identification number to the specific reception terminal, when the received unique information has not been registered in the master; and
transmitting company-wide guidance information or the guidance information corresponding to the identification number in the entry or the particular identification number extracted from company-wide information to the reception terminals.

7. A storage storing a program readable by a reception terminal for controlling the reception terminal to set guidance information, by:
transmitting unique information about the reception terminal from the reception terminal to a server when the reception terminal is connected to a network to which the server is connected;
receiving at the reception terminal an identification number corresponding to guidance information in response to transmitting said unique information to the server;
indicating the guidance information at the reception terminal to a user based on the guidance information extracted from company-wide information based on the received identification number; and
indicating the guidance information to a user, when said reception terminal has received no response from said server, based on the guidance information extracted from company-wide information stored in said reception terminal based on a last received identification number.

8. The storage of claim 7, wherein when said received number is a particular identification number designating company-wide guidance, company-wide guidance information is indicated to the user.

9. A storage storing a program readable by a master for controlling the master to set guidance information, by:
transmitting a power turn-on command or a power turn-off command to each reception terminal registered in the master through a network;
receiving unique information about each of the reception terminals transmitted therefrom through the network;
transmitting an identification number in an entry registered in the master to a specific reception terminal when the received unique information about the specific reception terminal has been registered in the master, registering new unique information and a particular identification number designating company-wide guidance in the master, and transmitting the particular identification number to the specific reception terminal, when the received unique information has not been registered in the master; and
transmitting company-wide guidance information or the guidance information corresponding to the identification number in the entry or the particular identification number extracted from company-wide information to the reception terminals.

10. A computer readable recording medium, which stores a program controlling a reception terminal to set guidance information, by:
transmitting the unique information about the reception terminal from the reception terminal to a server when the reception terminal is connected to a network to which the server is connected;
receiving at the reception terminal an identification number corresponding to guidance information in response to transmitting said unique information to the server;
indicating the guidance information at the reception terminal to a user based on the guidance information extracted from company-wide information based on the received identification number; and
indicating the guidance information to a user, when said reception terminal has received no response from said server, based on the guidance information extracted from a company-wide information stored in said reception terminal based on a last received identification number.

11. The computer readable recording medium of claim 10, wherein when said received identification number is a particular number designating company-wide guidance, company-wide guidance information is indicated to the user.

12. A computer readable recording medium, which stores a program controlling a master to set guidance information, by:

transmitting a power turn-on command or a power turn-off command to each reception terminal registered in the master through a network;

receiving unique information about each of the reception terminals transmitted therefrom through the network;

transmitting an identification number in an entry registered in the master to a specific reception terminal when the received unique information about the specific reception terminal has been registered in the master, registering new unique information and a particular identification number designating company-wide guidance in the master, and transmitting the particular identification number to the specific reception terminal, when the received unique information has not been registered in the master; and    transmitting company-wide guidance information or guidance information corresponding to the identification number in the entry or the particular identification number extracted from company-wide information to the reception terminals.

\* \* \* \* \*